June 24, 1969     D. SPAHRBIER     3,451,853

PLATE ASSEMBLY, CELL AND METHOD FOR MAKING SAME

Filed May 13, 1966     Sheet _1_ of 4

INVENTOR.
DIETER SPAHRBIER
BY Gerard J. Weiser
ATTORNEY

INVENTOR
DIETER SPAHRBIER
BY Gerard J. Weiser
ATTORNEY

June 24, 1969 D. SPAHRBIER 3,451,853
PLATE ASSEMBLY, CELL AND METHOD FOR MAKING SAME
Filed May 13, 1966
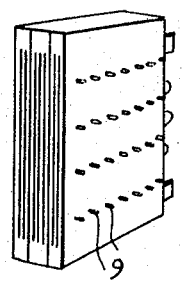
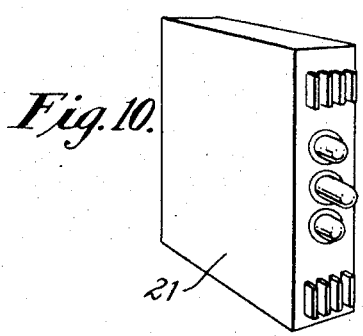
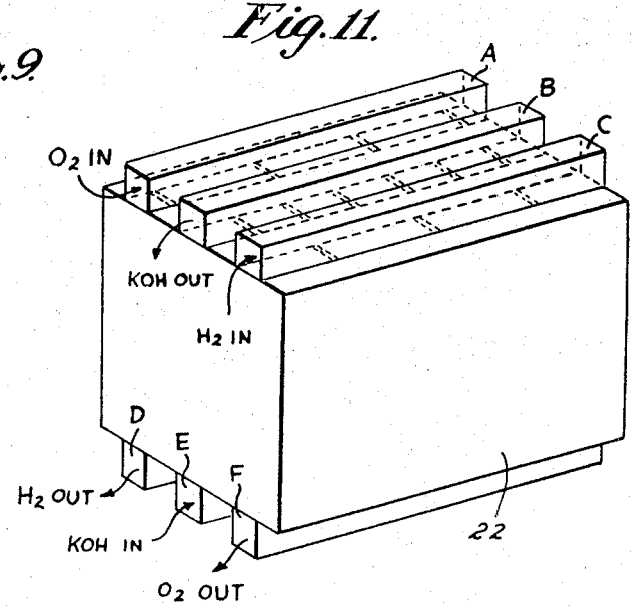
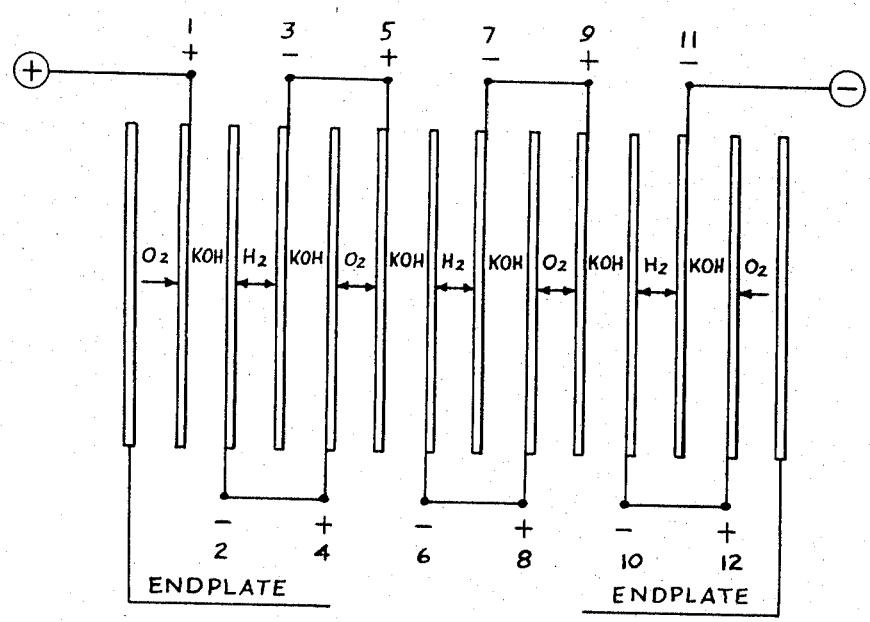
INVENTOR.
DIETER SPAHRBIER
BY Gerard J. Weiser
ATTORNEY.

United States Patent Office 3,451,853
Patented June 24, 1969

3,451,853
**PLATE ASSEMBLY, CELL AND METHOD
FOR MAKING SAME**
Dieter Spahrbier, Frankfurt am Main, Germany, assignor
to Varta Aktiengesellschaft Hagen, Westphalia, Germany, a corporation of Germany
Filed May 13, 1966, Ser. No. 549,910
Claims priority, application Germany, May 13, 1965,
V 28,464
Int. Cl. H01m 27/02
U.S. Cl. 136—86
15 Claims

ABSTRACT OF THE DISCLOSURE

A fuel battery comprising a plurality of electrode plates held as a stack of plates in prepositioned spaced relationship and distance-setting bodies rigidly connecting said plates to each other and sealing the space between said plates from each other. The distance-setting bodies preferably have a gasket. A process for making such stack of plates.

---

This invention relates to an assembly of spaced plates joined by castable distance bodies into a functional unit. Particularly, it relates to an assembly of precisely spaced thin plates joined by castable distance bodies into an array of plates having utility in heat transfer applications, electrochemical applications, electronic applications, and the like, wherever a multiplicity of thin plates is needed in the form of a compact unit which is able to withstand vibration, shock, acceleration and other mechanical abuse without sustaining substantial damage.

More particularly, the invention relates to electrochemical reaction apparatus for production of electrical energy by the conversion of at least one suitable fuel, e.g. liquid, solid, or gaseous, especially apparatus in the form of a fuel cell designed to operate as a low temperature, low pressure fuel cell having at least one fuel electrode and at least one oxygen electrode of the parallel plate type using electrodes which are assembled and held together in accordance with this invention. The invention also relates to the novel method of making an assembly of plates for use in a fuel cell of the above type.

The assembling and joining of thin plates in parallel array for use as electrical condenser plates, radiator, i.e., heating or cooling fins, or electrode packs, has previously been done by hot or cold riveting, bolting, screwing, and adhesives. These methods are for the most part successful where ample space exists between plate surfaces so that deformation of the plates by the fastener means and by thermal expansion and contraction presents no problem. However, in the manufacture of electrode plate assemblies, such as those used in fuel cells where distances between plates and space and weight are extremely important, it has been found that the use of the usual methods of fastening plates is not always practical or successful in accomplishing the desired purposes. For example, in cold riveting, the electrode metal for the plates and spacers between the plates must be made strong enough to withstand the force of the riveting, without distortion, thus placing a limit on the thinness and weight of metal that can be used. In hot riveting, the heat of the rivet may likewise cause distortion of the plates. When an adhesive is used, the adhesive must be applied in proper amount, for optimum adhesion, which is often difficult to estimate, and must be compatible under all operating conditions without deteriorating. Bolts and screws add weight to the cell assembly and are subject to corrosion. Furthermore, if the plates are not securely mounted relative to each other they may buckle and warp, thus causing the possibility of short circuits. In the case of sintered electrodes, the movement of the plates can cause the deposited catalyst to loosen. Also, the presence and the nature of catalysts used with the electrodes makes the use of these various techniques difficult or impossible.

According to the present invention, the above difficulties are avoided by using as the fastener means a castable material which upon setting and hardening serves to form a cast-in-place distance body and to hold an array of plates in their prepositioned relationship under all usual operating conditions experienced in a fuel cell or in the other apparatus for the uses described above.

The distance body or the plurality of distance bodies according to the invention, which is cast in situ from a material which is fluid at relatively low temperatures, pass through corresponding holes in the plates. The distance body fills out the hole in the plate completely and also envelops the portion of the plate adjacent to the hole. In this manner a mechanically rigid connection between the distance body and each of the respective plates is achieved. The connection is also tightly sealed. This tight seal is especially valuable when the space on one side of a plate must be sealed against the entrance of a liquid or gas from the space on the other side of a plate as is the case with the electrode plates of fuel cells.

The material for the distance bodies of this invention comprises castable material in form of a cold setting synthetic resin or an electrically conductive low melting metal having a fusion temperature below the fusion or deterioration temperature of the plates required to be assembled. The cold setting resin is especially advantageous where a non-conductive body is necessary. The low melting metal is especially advantageous where electrical or thermal conductance is needed and the distance body serves as a conductive connector between plates in an assembly.

In practicing the invention, an assembly of at least two plates which are to be fastened together are positioned, preferably in horizontal position, in a jig or positioning rack, with a series of precut holes in each plate aligned, preferably vertically, with corresponding holes in the other plates located wherever such plates are to be fastened together. Fastener material retaining dams are formed by spacer-gasket combinations and are then placed so that a dam concentrically surrounds a hole between each of the two opposing plate surfaces. Each hole in each plate is provided with a dam on each surface of each plate, except the outside plates of the assembly, with each of said dams being substantially greater in inner length and width or diameter than the corresponding length, width or diameter of the corresponding precut hole around which the dam is concentrically positioned. Flow gates, pipes, or ducts, for flowing material in castable form, i.e. fluid synthetic resin or fused metal, are positioned in leakproof contact against either the bottom or the top plate opposite each of the outside plate holes around the plate holes. Overflow gates or discharge pipes or ducts are likewise positioned opposite the outside plate holes on the opposite side of the plate assembly. Each of the flow and overflow gates is internally recessed substantially to make a cavity of about the same size as a dam at the plate contacting end of the gates. The whole assembly is then firmly compressed and locked together by compression means or clamps and held in sealed, compressed position during the introduction and setting of the material. The castable fastener material is introduced into each of the cavities created by the various assemblies of flow gates, dams, plate holes and overflow gates. Sufficient material is used to provide excess material above and below each outside plate hole on the top and bottom plates. The material is preferably introduced from below when the plate assembly is in horizontal position, thus advantageously avoiding air pockets or voids in the cast material. The cast material is then permitted to harden. The compression means, or clamps, are then released and the flow gates and overflow gates detached from around the excess material. The excess material is then trimmed from each distance body, substantially parallel to the outer surfaces of the two outside plates at a distance substantially equal to the thickness of a dam between a pair of plates. However, the projections, or end stubs, so formed may be thicker or thinner as desired. In any case, enough of the excess material should be retained on each end so that the end stubs firmly hold the end electrode plates to the distance bodies.

The invention is illustrated in the drawings wherein the same numerals refer to the same members in each of the figures. In the drawings:

FIG. 9 is a diagrammatic view of an assembled hydrogen-oxygen fuel battery viewed from the side and bottom.

FIG. 10 is a view of the top and one side of the encased battery of FIG. 9, showing the inlets for the electrolyte and hydrogen and oxygen gases.

FIG. 11 is a diagrammatic view of a fuel battery made according to the invention.

FIG. 12 is an electrical diagram showing the plate connections for the battery of FIG. 11.

Figure 1:
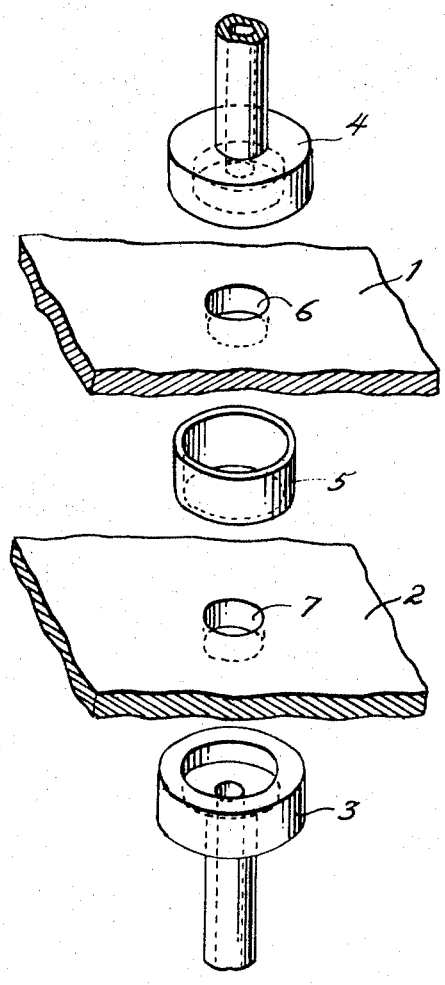
FIG. 1 is an expanded schematic view of the forming components, other than the fastener material, used to make a preferred embodiment of one joint of a fastened pair of plates.
Figure 2:
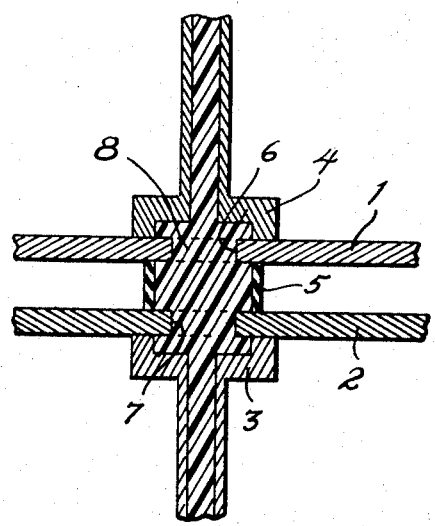
FIG. 2 is a cross-sectional view of a joint after the forming components of FIG. 1 have been compressed together and material has been introduced to form the joint.

Referring to FIG. 1, 1 and 2 are metal plates which are to be joined together at a pre-fixed distance from each other. Until the distance body cast in situ has solidified the distance between the plates is set by dam 5 which is preformed to a height equal to the pre-fixed spacing distance. Each of the plates 1 and 2 has a round hole 6 and 7 respectively which are filled with the fluid for the distance body material, from a supply means not shown. The dam 5 is tubular with the inner diameter of the tube sufficiently larger than the diameter of the holes 6 and 7 so that when the material is introduced into the holes and dam and hardens (with plates 1 and 2 pressing against the ends of dam 5), the hardened material will form shoulders which will abut tightly against the upper surface of plate 2 and the lower surface of plate 1, respectively. In FIG. 1, 3 is a flanged flow gate through which the fluid material for the distance body is introduced into hole 7 while the flange of the flow gate 3 is pressed tightly against the lower surface of plate 2. The flow gate 3 is provided with a duct through which the fluid material is passed under slight pressure. The inner diameter of the duct at the flange outlet is of about the same diameter as the outer diameter of dam 5. The duct is slightly tapered toward the inlet end so that after the fluid material has hardened, the flow gate can readily be removed. The hardened material is formed with a shoulder abutting tightly against the lower surface of plate 2. In FIG. 1, 4 is a flanged overflow gate which in size and shape is substantially identical to flow gate 3. In practice of the method of the invention, the overflow gate 4 is pressed tightly against the upper surface of plate 1 concentrically positioned over hole 6 and flow gate 3 is pressed tightly against the lower surface of plate 2 concentrically positioned over hole 7. A fluid material, preferably a quick-setting epoxy resin, is introduced into the inlet of flow gate 3 and flows upward through hole 7, dam 5, hole 6 and into overflow gate 4. The material is allowed to set until hard. Flow gate 3 and overflow gate 4 are then removed, leaving a projecting cylinder of hardened material above plate 1 and below plate 2. The projections are cut off at a distance about equal to the height of the dam 5. Plates 1 and 2 are then found to be firmly joined together by the distance body or bodies cast in situ in this manner.

FIG. 2 shows flow gate 3 and overflow gate 4, with plates 1 and 2 tightly held against dam 5 by the gates 3 and 4. In FIG. 2, 8 is hardened distance body.

Figure 3:
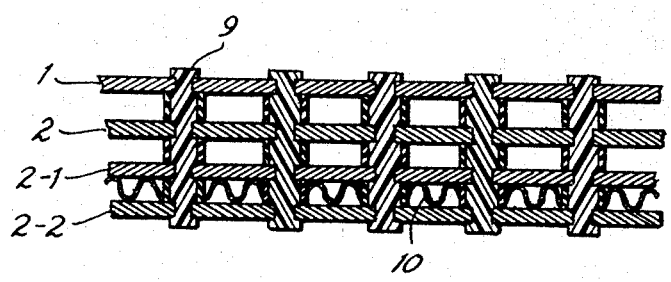
FIG. 3 is a cross-sectional view of a series of plates joined according to the invention.

FIG. 3 shows a series of four plates 1, 2, 2—1, and 2—2, joined together by a series of epoxy resin distance bodies 9, joined together substantially as described in connection with FIG. 1, above. In FIG. 3, 10 is a corrugated strip of metal or plastic which is advantageously placed between adjacent plates to provide additional support and/or contact between a pair of plates, when this is desired, e.g. for heat transfer purposes.

Figure 4:
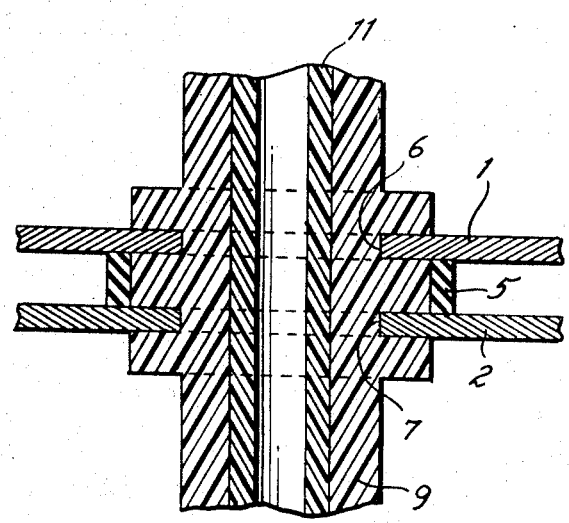
FIG. 4 is a cross-sectional view of an embodiment with a passageway formed through the material and the flow and overflow gates removed.

FIG. 4 shows an embodiment wherein a tube 11 has been molded concentrically within the material in holes 6 and 7. The tube 11 preferably is a plastic material, i.e. polytetrafluoroethylene. However, it can also be made of metal, e.g. copper or aluminum. The tube 11 serves as a passageway for gaseous or liquid materials between two or more series of plates.

Figure 5:
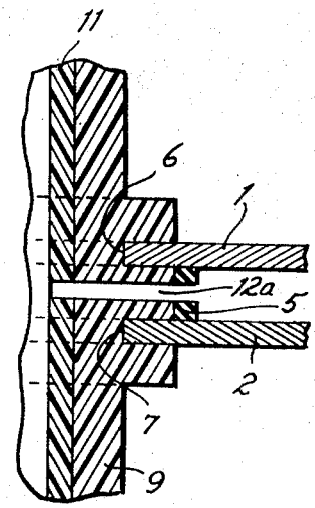
FIG. 5 is a cross-sectional view of one half of a distance body having passageways formed both vertically and horizontally through the body and the flow and overflow gates removed.

FIG. 5 shows an embodiment wherein, in addition to having the tube 11, the distance body is provided a transverse passageway 12a. The passageway can be made by placing a removable core, not shown, through corresponding side holes in dam 5, and tube 11, before casting the distance body. On removing the core, the transverse passageway 12a remains, providing access to tube 11 and to the space between adjacent plates 1 and 2.

Figure 6:
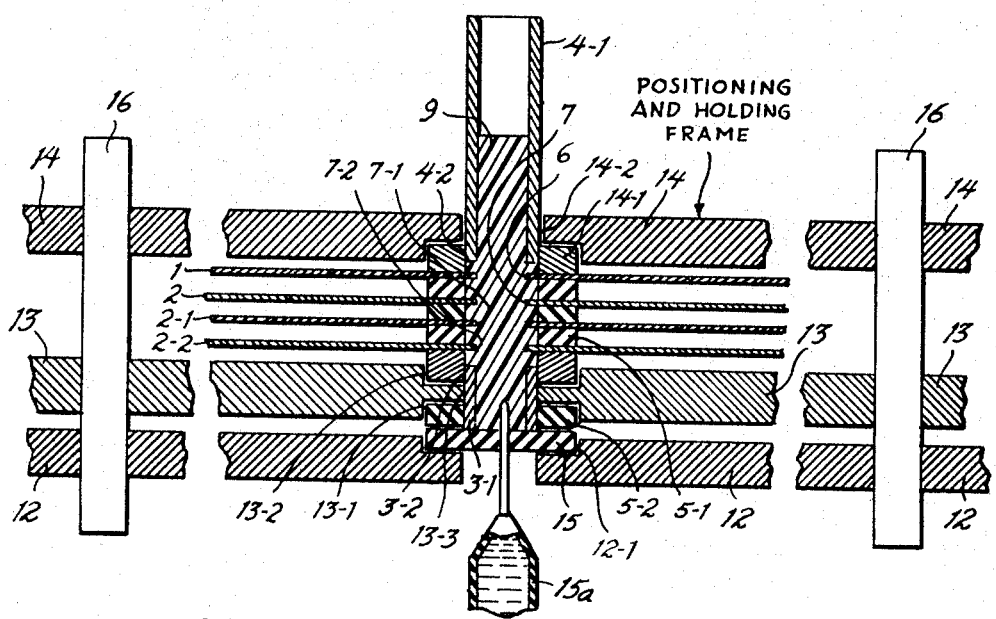
FIG. 6 is a schematic cross-sectional view of an embodiment in which a series of four plates is mounted in a positioning jig in acordance with the novel method of introducing the material for the distance body through a rubber diaphragm as described herein.

FIG. 6 shows an advantageous embodiment wherein the fluid material for the distance body 9, is injected into the mold, formed by flow gate 3—1, the dams 5—1, and outflow gate 4—1, through a flexible diaphragm 15 by means of an injection means, e.g. a syringe 15a. In FIG. 6, 12 is the bottom plate of a positioning and holding frame or jig, mounted on holding pins 16, with a recess 12—1 for centering and holding the diaphragm 15. A second centering and holding plate 13 is mounted on pins 16 and positioned concentrically with diaphragm 15. The plate 13 has a pair of recesses 13—1 and 13—2 for holding a pair of gasket-type dams 3—2 and 5—2 and a hole 13—3 for receiving and holding a flow gate 3—1 in the form of a pipe sealingly held by the dams 3—2 and 5—2 and diaphragm 15 concentrically positioned opposite holes 6, 7, 7—1 and 7—2 in plates 1, 2, 2—1 and 2—2. The latter plates are stacked together with dams 5—1, in the form of neoprene gaskets, separating each pair of plates. A dam 4—2 is placed on top of plate 1 and is held and positioned by recess 14—1 of centering and holding plate 14. Plate 14 is heavy enough to sealingly compress dams 5—1 against the intervening plates 1, 2, 2—1 and 2—2. Plate 14 is provided with a hole 14—2 in which overflow gate 4—1, in the form of a pipe, is positioned. The plates 1, 2, 2—1 and 2—2 are aligned with each other and gates 3—1 and 4—1 by suitable means, e.g. by passing a close-fitting rod down through the openings and then withdrawing the rod. Fluid material for the distance body 9, preferably epoxy resin, is then injected into the cavity from the syringe 15a by passing the needle of the syringe through the diaphragm and withdrawing the syringe when sufficient material has been injected to fill overflow gate 4—1 at least above the bottom level of plate 14. Upon setting, the distance body holds the plates 1, 2, 2—1 and 2—2 in firm connection with each other with the dams 5—1 providing resiliency between the plates.

FIGURES 7A and B show sections through the electrolyte and gas-space, respectively, of a fuel cell. The electrode plates have been combined to form a stack of plates according to the invention by means of the distance bodies 9. For clarity's sake only the part of the distance body 9 passing through the hole in the electrode plate is indicated and the part of the body between plates which has a larger diameter has not been drawn. The drawing is not to scale. The gaskets 18, which possess cutouts to form the conduits for the electrolyte and the reaction gases such as hydrogen and oxygen of the fuel cell, were placed between the electrode plates before assembly of the stack of plates according to the invention. The outer envelope 17 of the fuel cell is here also cast from epoxy resin and it may consist of the same material as is used in casting the distance bodies 9.

Figure 8:
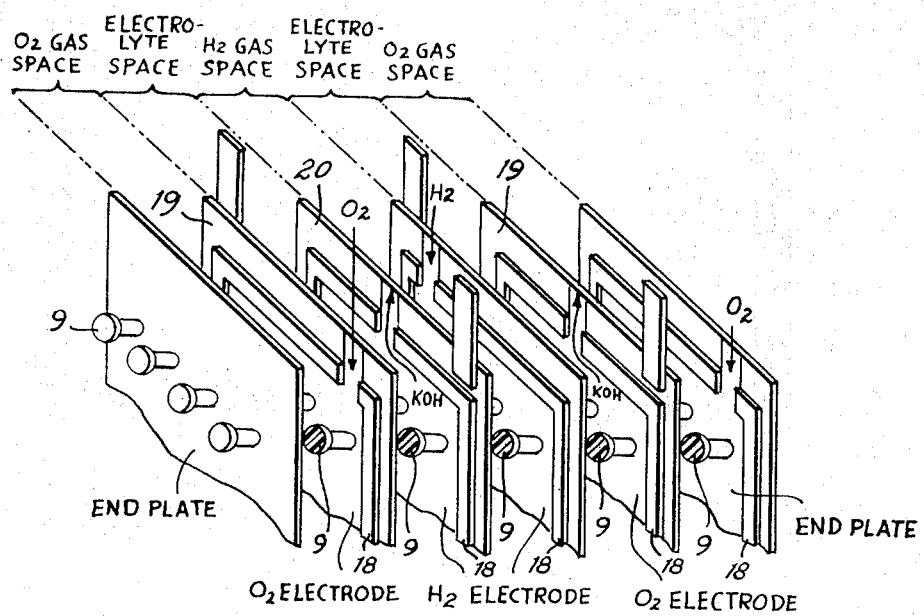
FIG. 8 is an exploded view of a fuel battery having two cells where the electrodes are combined in a package of plates according to the invention.

FIG. 8 shows an expanded view (not to scale) of the upper part of a fuel battery containing two cells. The two hydrogen electrodes 20 have a common gas space. The electrodes 20 consist of a fine porous nickel carrier and covering layer of 0.6 mm. thickness, and a porous catalyst layer of carbonyl nickel and activated nickel. The total thickness of the electrode plate 20 is 1 mm. and the surface area of this postcard-size electrode is approximately 150 sq. cm. The oxygen electrodes 19 also consist of a porous sintered nickel carrier layer of 0.4 mm. thickness and a porous catalyst layer containing activated silver and nickel; the total electrode thickness is 1 mm. and the oxygen electrodes 19 have the same size as the hydrogen electrodes 20. The end plates are porous sintered nickel plates of 1 mm. thickness. The pores of these plates are filled with epoxy resin when the outer envelope of the battery is cast.

The length of the smaller diameter sections of the distance bodies 9 is actually smaller than in the drawing, this length being equal to the plate thickness.

FIG. 9 shows a fuel battery complete with an epoxy resin outer envelope. The projecting ends of the distance bodies 9 are still visible.

Figure 7:
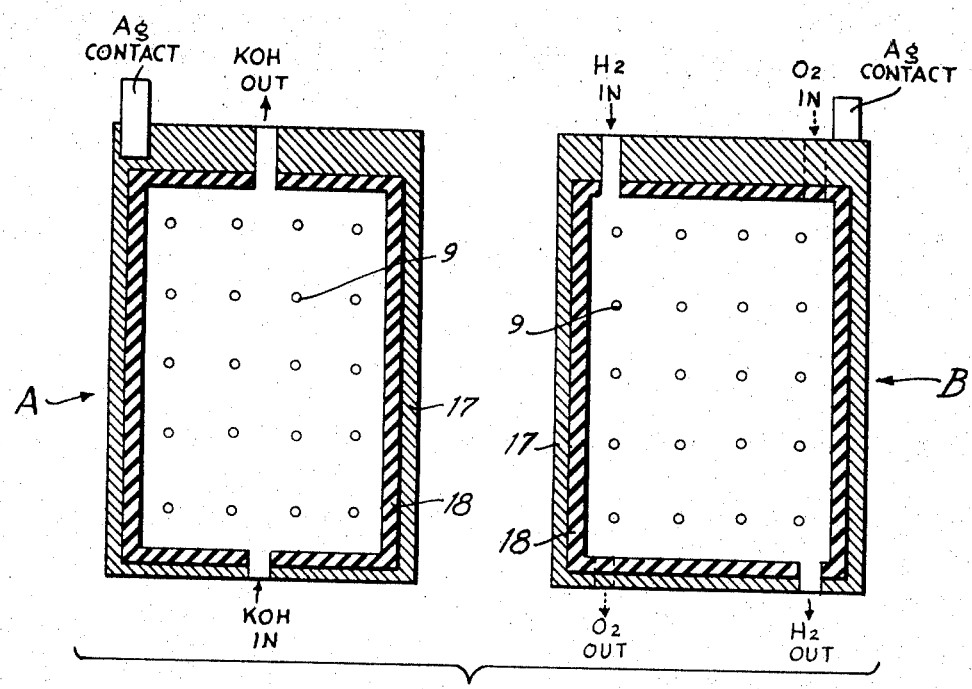
FIG. 7 shows a section through the electrolyte space respectively the gas-space of a fuel cell using a package of plates according to the invention.

FIG. 10 shows the front part of the battery of FIG. 9 after these ends have been removed. The silver contacts of FIG. 7 are visible at the top and the bottom of the front face of the battery and the supply tubes for hydrogen, electrolyte and oxygen are shown in the center of the front face.

FIG. 11 shows a fuel battery which has been further encased in an outer case 22. In FIG. 11, A, B, C, D, E and F are conduits through which the oxygen, hydrogen, potassium hydroxide electrolyte and water formed from the reaction pass as indicated by the arrows in the figure.

FIG. 12 is an electrical diagram showing the connections for the electrodes in the six-cell battery of FIG. 11.

Examples of cold setting synthetic resins which can be used in practice of the invention include epoxy and other polyether resins, melamine-formaldehyde, ureaformaldehyde, phenol-formaldehyde, polyesters, inclusive of the unsaturated types and alkyds, polyurethanes, silicone resins, diallylphthalate and other allylic resins. While the thermosetting resins are generally preferred, in special cases it is also possible to use thermoplastic polymers at temperatures considerably below that at which they are flowable. Typical thermoplastic resins include acetals, vinyl and vinylidene unsaturated resins, e.g., polymethacrylates and acrylates, polystyrene, ethylenically unsaturated resins like polytetrafluoroethylene, as well as copolymers of these resins. By selection of suitable fillers and of the type of resins, optimum setting conditions and properties are obtained. The resins can be electrically conductive as such, or they may contain electrically conductive material such as graphite or metals. Epoxy resins of the type well-known in the electric storage battery art are preferably used in the fuel cell hereof.

Examples of low melting metal which can be used to practice the invention include Wood's metal (M.P. 60° C.), Newton's metal (M.P. 103° C.), Lipowitz's metal (M.P. 70° C.) and Rose's metal (M.P. 94° C.). Each of the above metals is well-known as an alloy of bismuth, lead, tin, and cadmium. Higher melting alloys of lead and tin, melting as high as 200° C., can be advantageously used in some applications where higher temperatures are to be encountered in operation, provided the metal used for the plates also can tolerate the higher temperature. For use in radiator apparatus higher melting metal is preferably used.

The plates which can be joined together by the method of this invention may be metallic, non-metallic, porous or non-porous. They can be made of any type of metal whether rolled in the form of a film, a foil, or woven to form a screen or mesh or membrane, or sintered to form a sheet. They can be ceramic, or carbon, or glass, or plastic. They can be flat or curved or contoured and of irregular thickness. They can be of any length and width. The surfaces of the plates can be smooth or of any desired texture. The electrode which are combined to a package of plates may be of any suitable size and thickness such as from about 0.5 to 1.5 mm. thickness. A practical size may be 100 mm. x 150 mm. An entire fuel battery may have the following size 16.5 cm. x 2 cm. x 10.5 cm. The electrodes can be porous or not. Their porosity may range from 10 to 85% by volume. The catalytic material for the electrode can be applied on the electrode, or embedded therein in any suitable manner. When fuel cells are constructed with the plate package of the invention, the electrodes may be made with known materials as described for instance in Fuel Cells (Ed Young), vols. 1 and 2, Reinhold Publishing Corporation (1960), or Fuel Cell System, Advances in Chemistry series, 47, ACS, 1965.

The fastening operation can be carried out in individual steps by hand or it can be carried out continuously in an automatic line.

The holes in the plates may be of any convenient configuration, e.g., round, square, triangular, oval, or the like. They may be of different size and/or configuration. The holes can be made by any of the methods known in the art, such as by drilling, stamping, molding, or burning.

The amount of pressure applied to compress the stack of plates must be adequate to seal the plates against the dams 5. When the dams are a resilient material, sufficient pressure should be applied to cause the dams to have a stress which will serve to hold the plates firmly and thus help absorb vibration. The dams 5 may be made of any type of material. Preferably, they are made of material which has a slight give of elasticity under compression. However, well-machined surfaces on the ends of the dams 5 will form a suitable seal against the surfaces of plates which also are smooth.

The dams preferably are left in place between the plates. However, in some cases it will be advantageous to remove the dams after the distance body has been formed. This can be done by choosing an appropriate material for the dam, so that the dam can be removed chemically, physically, or by heating, as may be appropriate. By leaving the dams in the assembly, additional strength is provided to the assembly.

Where a passageway is desired through the distance body, any suitable material can be used for that purpose, including metal or plastic such as a metal cable or tube or rod. The tube-forming material can be removed or allowed to remain in the distance body.

An important advantage of this invention is that the distance bodies can be used throughout the whole area of an electrode plate rather than merely around the framing edges. This is especially advantageous where thin closely spaced fragile plates are stacked together. The dams keep the plates from moving and from developing vibrations which would cause them to break or contact each other. These features are particularly desirable in fuel cells. Such cells are known, as was discussed above, and comprise a fuel electrode and an oxygen electrode, which are spaced apart in an electrolyte bath. The electrodes are generally in the form of porous bodies, and a gaseous oxidizing agent, such as oxygen, air or halogen is passed to the gas space of the oxygen electrode, while a gaseous fuel is passed to the gas space of the fuel electrode. Suitable fuels for conversion to electrical energy are known such as hydrocarbons and/or oxygenated hydrocarbons, like carbon, hydrogen, oxygen, alcohols, aldehydes, ketones, ethers, esters and carboxylic acids. The electrolyte may be basic, such as potassium hydroxide, or an acid. The method and assembly of the invention thus provides a valuable advance in the technology of fuel cell construction and use.

Many different embodiments of this invention may be made within the scope and spirit of it, and it is intended that all such embodiments besides those illustrated herein be included in the invention as claimed.

I claim:
1. As an article of manufacture, a fuel battery containing a plurality of electrode plates and a plurality of offset distance bodies, said plates being combined and fastened in spaced relationship to form a substantially rigid stack of plates by means of the offset distance bodies, said stack of plates defining between them spaces for liquids or gases each of said bodies passing through corresponding holes of successive electrodes and said bodies being of a hard-setting material or materials and the hardened material of said distance bodies enveloping the part of the electrode adjacent to the hole.
2. The fuel battery of claim 1 in which at least one of the plates is porous.
3. The fuel battery of claim 1 in which the hardened material fills the pores of the plates adjacent the hole, thereby providing a gas- and liquid-tight seal.
4. The fuel battery of claim 1 in which the spacing bodies comprise a hollow spacer dam-like means positioned between the plates concentrically with the holes in the plates.
5. The fuel battery of claim 1 in which at least one of the spacing bodies is a hollow passageway.
6. The fuel battery of claim 1 in which the passageway is connectively open to the cell between the plates.
7. The fuel battery of claim 1 in which the spacing bodies are of a synthetic resin.
8. The fuel battery of claim 1 in which the spacing bodies are of electrically non-conductive material.
9. The fuel battery of claim 1 in which the spacing bodies are of electrically conductive material.
10. The fuel battery of claim 1 which comprises a strip of metal or plastic positioned between adjacent plates and in contact therewith.

11. A method for fastening together in opposed spaced relationship at least two plates to form at least one fastened joint which method comprises the steps of
 (a) providing at least one hole in each of a pair of plates with the centers of such holes on the same center line when the plates are positioned parallel to each other,
 (b) placing between said plates between each corresponding pair of holes a spacer dam, said dam being positioned concentrically with said pair of holes in said plates,
 (c) placing opposite the outer surface of one outside plate opposite each of said holes a flow gate with an internal passageway substantially greater in inner diameter at the plate end than the hole in the plate, said gate being positioned concentrically with said hole,
 (d) placing opposite the outer surface of the other outside plate opposite each of said holes an overflow gate with an internal passageway substantially greater in inner diameter at the plate end than the hole in the plate, said gate being positioned concentrically with said hole,
 (e) compressing together in sealed position each dam, each of said plates, each of said flow gates and each of said overflow gates,
 (f) introducing a fluid, hardenable fastener material into each of the cavities formed by said dams, plate holes, and flow gates and overflow gates, and
 (g) hardening said fastener material thus forming a cast-in-place fastener.

12. The method according to claim 11 wherein the fastener material is a hardsetting synthetic resin.
13. The method according to claim 11 where the fastener material is an epoxy resin.
14. The method according to claim 11 wherein a tube is positioned concentrically within at least one of said cavities perpendicular to said plate surfaces and said fluid fastener material is introduced around the exterior of said tube.
15. The method according to claim 11 wherein a rod is positioned within at least one of said dams with its ends passing through the sidewalls of said dam, said fluid fastener material being inserted around said rod within said dam during forming of said fastener, and removing said rod.

References Cited
UNITED STATES PATENTS 1,880,786  10/1932  Carey _____ 164—109
2,840,916   7/1958  Mueller _____ 264—261 XR
2,962,409  11/1960  Ludlow et al. ____ 264—261 XR ALLEN B. CURTIS, Primary Examiner.

DONALD L. WALTON, Assistant Examiner.

U.S. Cl. X.R.

136—151; 164—109; 264—261